(12) United States Patent
de Swardt et al.

(10) Patent No.: US 9,145,089 B2
(45) Date of Patent: Sep. 29, 2015

(54) SOCKET JOINT WITH INTEGRATED TUBE ANCHORS

(71) Applicant: Lang-Mekra North America, LLC, Ridgeway, SC (US)

(72) Inventors: Rolf Reitz de Swardt, Blythewood, SC (US); Alexandre Petroff, Columbia, SC (US); Andreas Enz, Columbia, SC (US)

(73) Assignee: Lang-Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 14/467,368

(22) Filed: Aug. 25, 2014

(65) Prior Publication Data

US 2015/0060628 A1    Mar. 5, 2015

Related U.S. Application Data

(60) Provisional application No. 61/871,988, filed on Aug. 30, 2013.

(51) Int. Cl.
| | |
|---|---|
| *A47G 1/16* | (2006.01) |
| *A47G 1/24* | (2006.01) |
| *B60R 1/06* | (2006.01) |
| *F16C 11/06* | (2006.01) |
| *F16M 13/02* | (2006.01) |
| *B60R 1/00* | (2006.01) |
| *B60R 11/04* | (2006.01) |

(52) U.S. Cl.
CPC ... *B60R 1/06* (2013.01); *B60R 1/00* (2013.01); *B60R 11/04* (2013.01); *F16C 11/06* (2013.01); *F16M 13/02* (2013.01); *B60R 1/0605* (2013.01)

(58) Field of Classification Search
CPC .......... B60R 1/06; B60R 1/00; B60R 1/0605; B60R 11/04; F16C 11/06; F16M 13/02
See application file for complete search history.

(56) References Cited

U.S. PATENT DOCUMENTS

| | | | |
|---|---|---|---|
| 2,071,883 A | 2/1937 | La Hodny | |
| 3,993,281 A | 11/1976 | McCarroll | |
| 4,753,405 A | 6/1988 | Camilleri | |
| 4,988,178 A * | 1/1991 | Eifert | 359/871 |
| 4,989,817 A | 2/1991 | Camilleri | |
| 5,110,196 A | 5/1992 | Lang et al. | |
| 5,326,062 A | 7/1994 | Remmers | |
| 6,302,549 B1 * | 10/2001 | Branham et al. | 359/871 |
| 6,491,402 B1 | 12/2002 | Stenzel | |
| 6,692,176 B1 | 2/2004 | Fladhammer | |
| 6,910,781 B2 * | 6/2005 | Spychalla et al. | 359/872 |

(Continued)

*Primary Examiner* — Amy Sterling
(74) *Attorney, Agent, or Firm* — McNair Law Firm, P.A.; Seann P. Lahey

(57) ABSTRACT

A socket joint for a mirror assembly having a first concave portion receiving a support tube that attaches to the vehicle. A pair of anchors disposed in the first concave portion extend through openings in the support tube. The anchors project outwardly from the first concave portion into the support tube. Each anchor engages an interior surface of the support tube. A fastener engages each anchor from a front side of the socket joint to clamp the support tube between the anchor and first concave portion. A central connecting post extends outward from the front side of the socket joint for cooperating with various assembly components to pivotally mount a mirror head. A second concave portion is disposed around the central connecting post which receives a complementary convex portion of the mirror head housing so that the housing can pivot on the second concave portion around the central connecting post.

18 Claims, 9 Drawing Sheets

(56) References Cited

U.S. PATENT DOCUMENTS

| | | |
|---|---|---|
| 7,044,612 B2 * | 5/2006 | Centmayer et al. ............ 359/876 |
| 7,175,292 B2 * | 2/2007 | Flynn ............................ 359/876 |
| 7,448,765 B2 * | 11/2008 | Lang et al. .................... 359/879 |
| 7,628,372 B2 | 12/2009 | Norman |
| 8,246,266 B2 * | 8/2012 | Lang et al. ....................... 403/87 |
| RE44,016 E | 2/2013 | Remmers |

* cited by examiner

SOCKET JOINT WITH INTEGRATED TUBE ANCHORS

BACKGROUND OF THE INVENTION

1) Field of the Invention

The present invention relates to vehicle mirror assemblies, and more particularly, to a socket joint for pivotally carrying a mirror head on a support tube that mounts to a vehicle.

2) Description of Related Art

Exterior mirror assemblies for commercial vehicles are relatively large, since, as a rule, several mirror elements and/or mirror heads combined with several mirror elements may be present. For this reason, the mirror heads with one or more mirror elements are often fastened onto a support member, for instance, steel tubing, mounted to the vehicle exterior. The fastening of the mirror heads onto the support tube is typically done by means of clamp fittings with a first and a second clamping part, which in combination, encompass the support tube.

Because clamp connections grip the support tube from both sides, the clamping parts can be bulky to firmly attach and support the mirror head on the support tube. This can cause aerodynamic turbulence around the mirror head and lead to various unwanted results, such as poor fuel economy and vibration of the mirror head. Excessive vibration can create disproportionate wear on the support and mounting components, leading to a premature failure of the mirror assembly.

To attempt to avoid these issues with a clamp type arrangement, an aerodynamically streamlined covering is provided over and incorporated into the clamping components to attempt to avoid unpleasant turbulence at driving air speed and to prevent excessive vibration. These type of clamp connections, however, increase manufacturing costs and assembly complexity. Additional problems arise in attempting to properly align such clamp type connections and position the mirror head assembly on the support tube. Also, the increased number of parts to make the connection to the support tube can undesirably increase the weight of the mirror assembly. Further, the clamp connection does not tend to provide an aesthetically appealing and streamlined arrangement.

Accordingly, it is an object of the present invention to provide an improved connection for mounting a mirror head to a support tube having increased stability, improved aerodynamics, and reduced weight.

Accordingly, it is a further object of the present invention to provide an improved connection for mounting a mirror head to a support tube having reduced manufacturing costs and assembly complexity by using fewer parts.

SUMMARY OF THE INVENTION

The above objectives are accomplished according to the present invention by providing a socket joint for mounting a mirror head to a support tube on a vehicle exterior, the socket joint comprising a first concave portion disposed on a rear side of the socket joint and adapted for receiving the support tube that attaches to the vehicle; a pair of anchors disposed in the first concave portion for engaging an interior surface of the support tube; a fastener engaging each of the anchors through a front side of the socket joint and directing the anchors toward the first concave portion so that the support tube is clamped between the anchors and the first concave portion; a central connecting post extending outward from the front side for cooperating with the mirror head in interlocking engagement; and, a second concave portion disposed around the central connecting post for engaging a complementary convex portion of a housing of the mirror head so that the housing is pivotally carried on the second concave portion for adjusting the angle of the mirror head.

In one advantageous embodiment, the first concave portion defines a channel having a channel engaging surface for engaging an exterior surface of the support tube.

In one advantageous embodiment, the channel engaging surface has a complementary shape to the exterior surface of support tube so that the channel engaging surface fits flush against the exterior surface of support tube along the length of the first concave portion.

In one advantageous embodiment, the anchors each include a securing arm spaced from and extending laterally above the channel engaging surface of the first concave portion, and a hollow fastener prong for receiving the fastening member, wherein the anchors project outwardly from the first concave portion.

In one advantageous embodiment, the spacing between a back side of the securing arm and the channel engaging surface of the first concave portion defines a tube gap for receiving the support tube so that the back side of each the anchor engages the interior surface of the support tube and the channel engaging surface engages the exterior surface of the support tube in a clamping arrangement.

In one advantageous embodiment, the tube gap is approximately the thickness of the wall defining the support tube so that the support tube is received in a flush engagement with the back side of the securing arm and the channel engaging surface when mounted.

In one advantageous embodiment, the back side of the securing arm is convex and complementary to a curvature of the interior surface of the support tube.

In one advantageous embodiment, a central cavity is disposed within the first concave portion for improved weight reduction.

In one advantageous embodiment, a plurality of central support walls extend through the central cavity to maintain the strength of the socket joint and engagement with the support tube through the region of the central cavity.

In one advantageous embodiment, each of the central support walls includes a concave top surface defining a portion of the first concave portion adapted for engaging the support tube.

In one advantageous embodiment, an extension tab projects upward from a top side of the socket joint, wherein the extension tab includes a concave surface continuous with and further defining the first concave portion.

In one advantageous embodiment, one of the anchors is carried by the extension tab for positioning the anchor relative to the support tube and covering an opening in the support tube through which the anchor is inserted when mounted.

In one advantageous embodiment, the second concave portion includes a pivot surface defined by a plurality of rounded knobs projecting upward for engaging the mirror head housing so that only the tops of the rounded knobs engage the mirror head housing to allow dust and debris to collect in grooves between the rounded knobs, whereby unwanted wear between components is reduces by channeling away debris through the grooves.

In one advantageous embodiment, a perimeter cavity is disposed between the second concave portion and an exterior wall of the socket joint for weight reduction.

In one advantageous embodiment, a plurality of perimeter support walls are carried in the perimeter cavity to provide strength to the socket joint and engagement with the mirror head housing.

In one advantageous embodiment, a series of the perimeter support walls includes a concave surface portion extending upward from and maintaining the curvature of the pivot surface for engaging the mirror head housing.

In one advantageous embodiment, at least one rib is disposed on the central connecting post for engaging a keyway of connecting components in the mirror head for interlocking engagement with the central connecting post.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1:
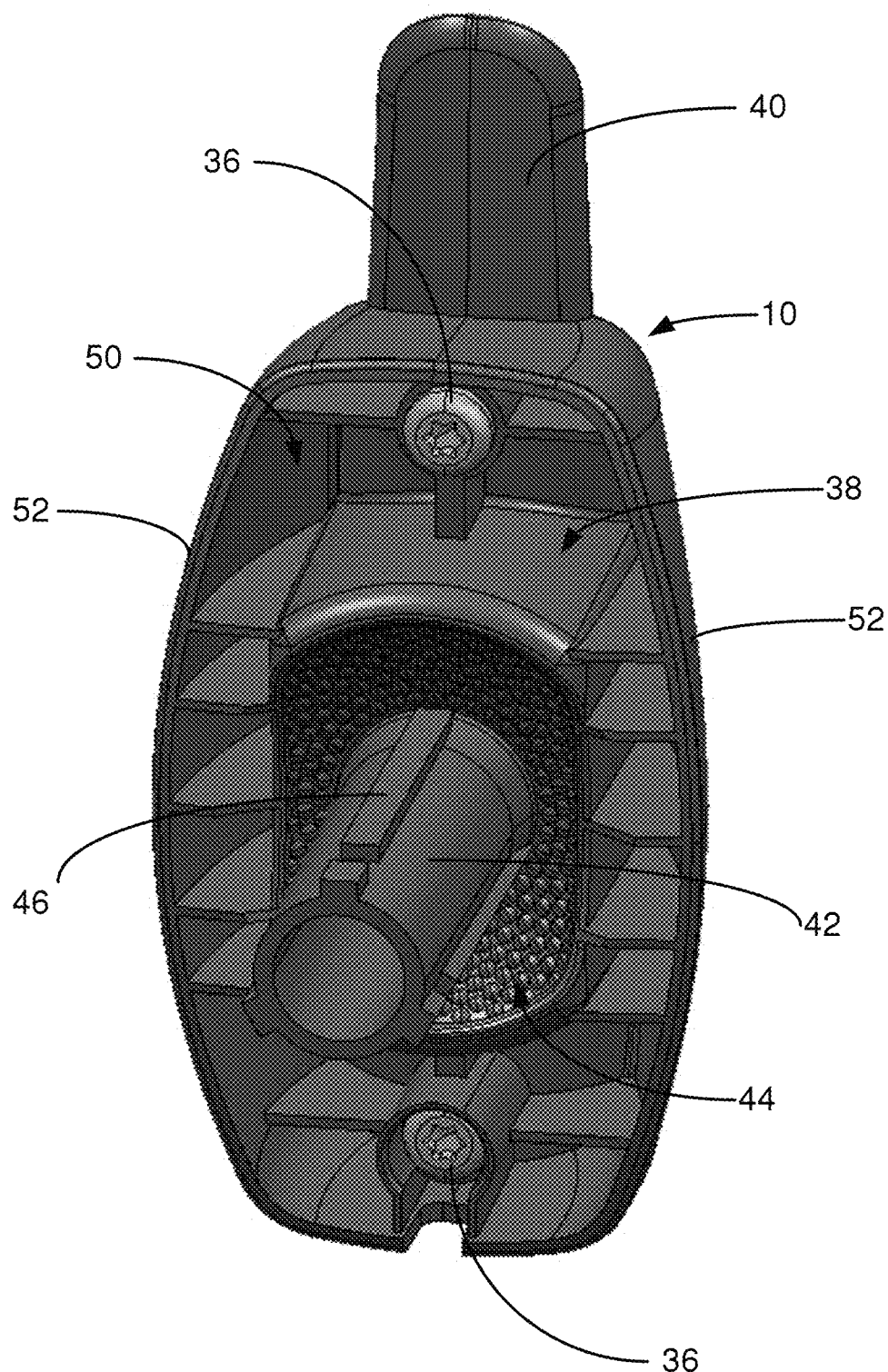
FIG. 1 shows a front perspective view of the socket joint according to the present invention.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a specific embodiment, it will be appreciated that the description is illustrative of the invention and is not constructed as limiting of the invention. Various modifications and applications may occur to those who are skilled in the art, without departing from the spirit and the scope of the invention. Likewise, other objects, features, benefits and advantages of the present invention will be apparent from this summary and certain embodiments described below. Such objects, features, benefits and advantages will be apparent from the above in conjunction with the accompanying detailed description and all reasonable inferences to be drawn therefrom.

DETAILED DESCRIPTION OF A PREFERRED EMBODIMENT

With reference to the drawings, the invention will now be described in more detail. In the drawings, a socket joint, designated generally as 10, is shown for carrying a mirror head and attaching to a support tube 12. The mirror head, as understood by those skilled in the art, generally comprises the mirror glass, housing and connecting elements that are mounted to socket joint 10. In some arrangements, multiple mirror heads can be mounted to a single support tube 12.

Figure 3:
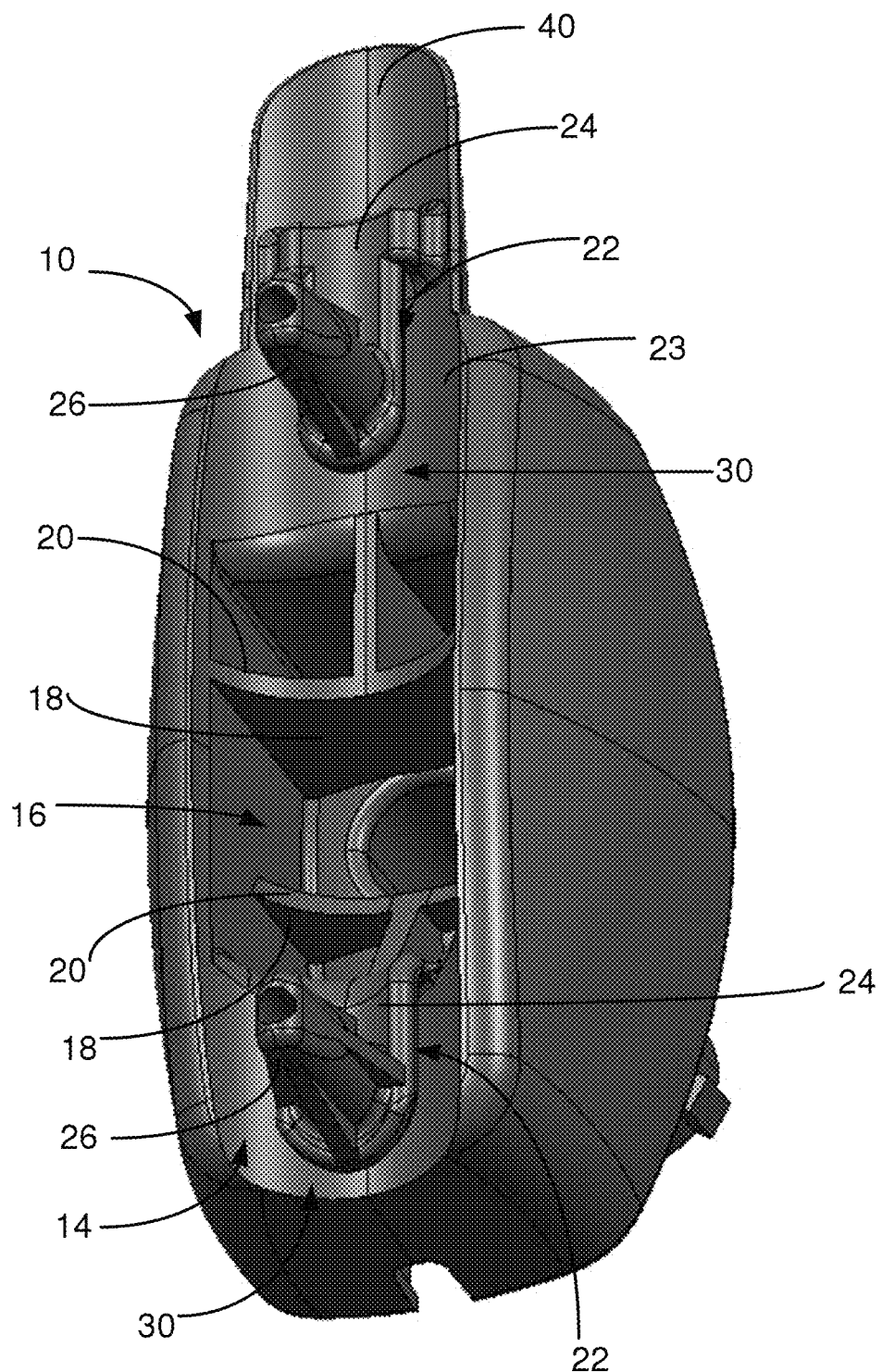
FIG. 3 shows a rear perspective view of the socket joint according to the present invention.
Figure 6:
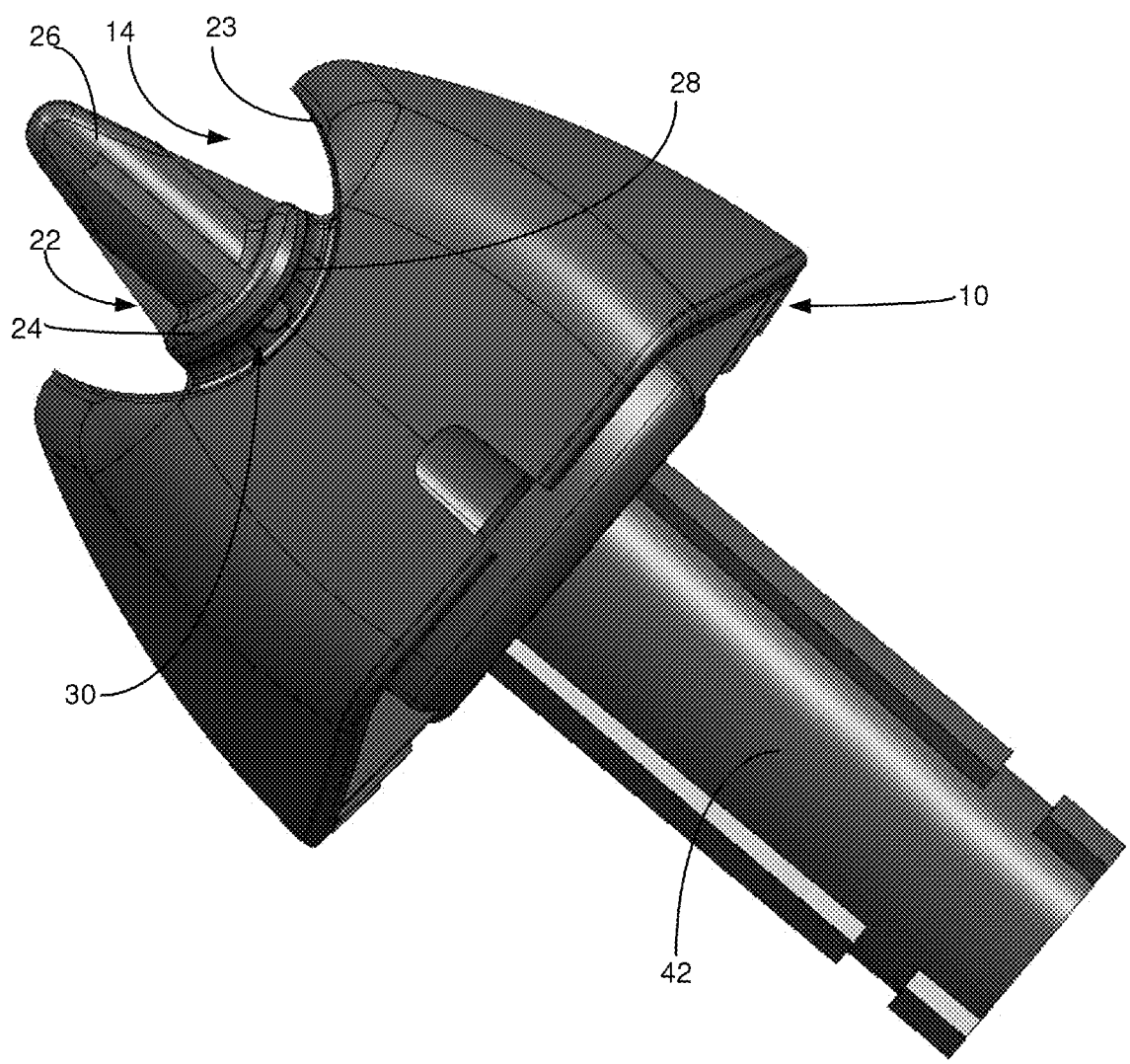
FIG. 6 shows a bottom view of the socket joint according to the present invention.
Figure 7:
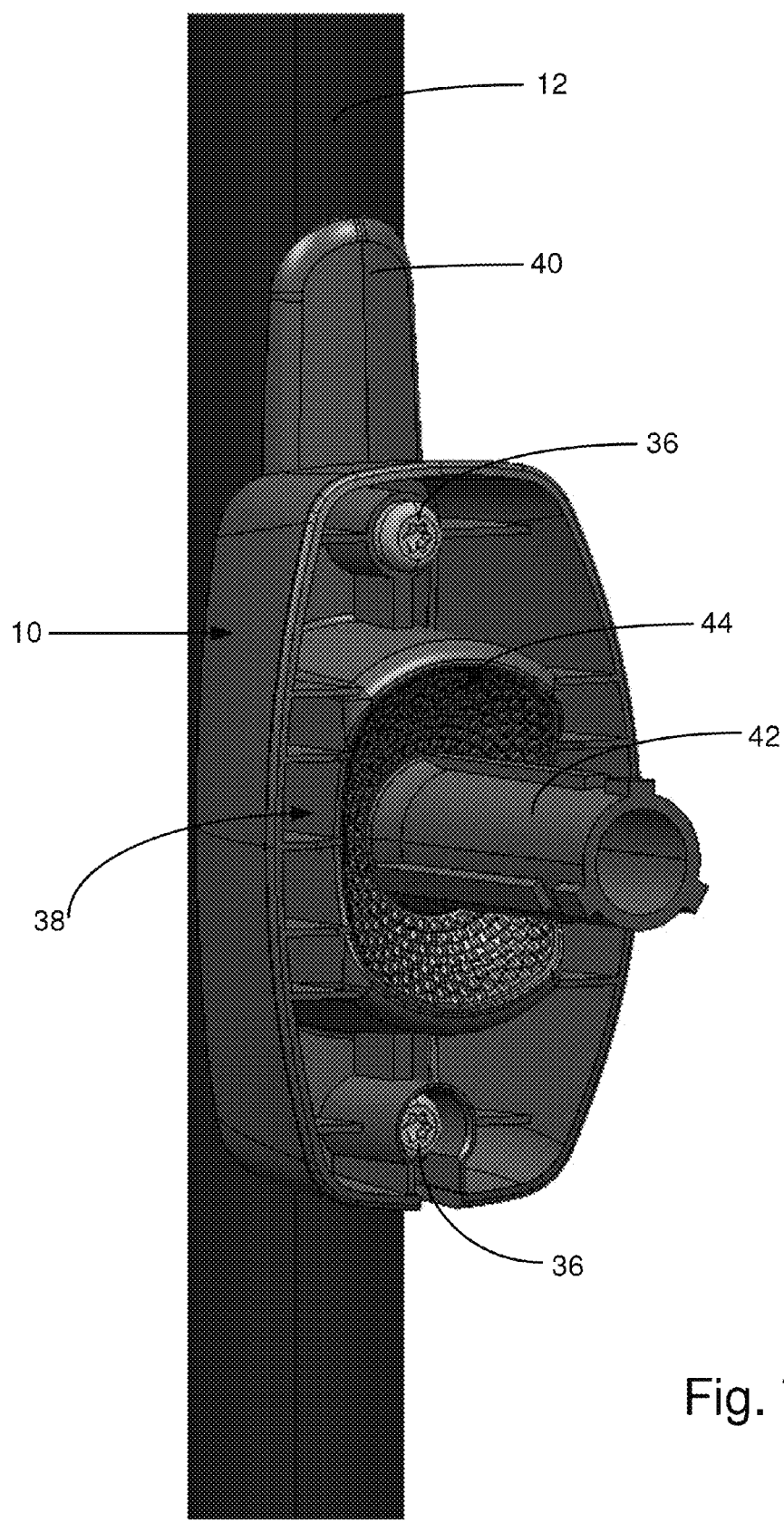
FIG. 7 shows a perspective view of the socket joint mounted to a support tube according to the present invention.
Figure 9:
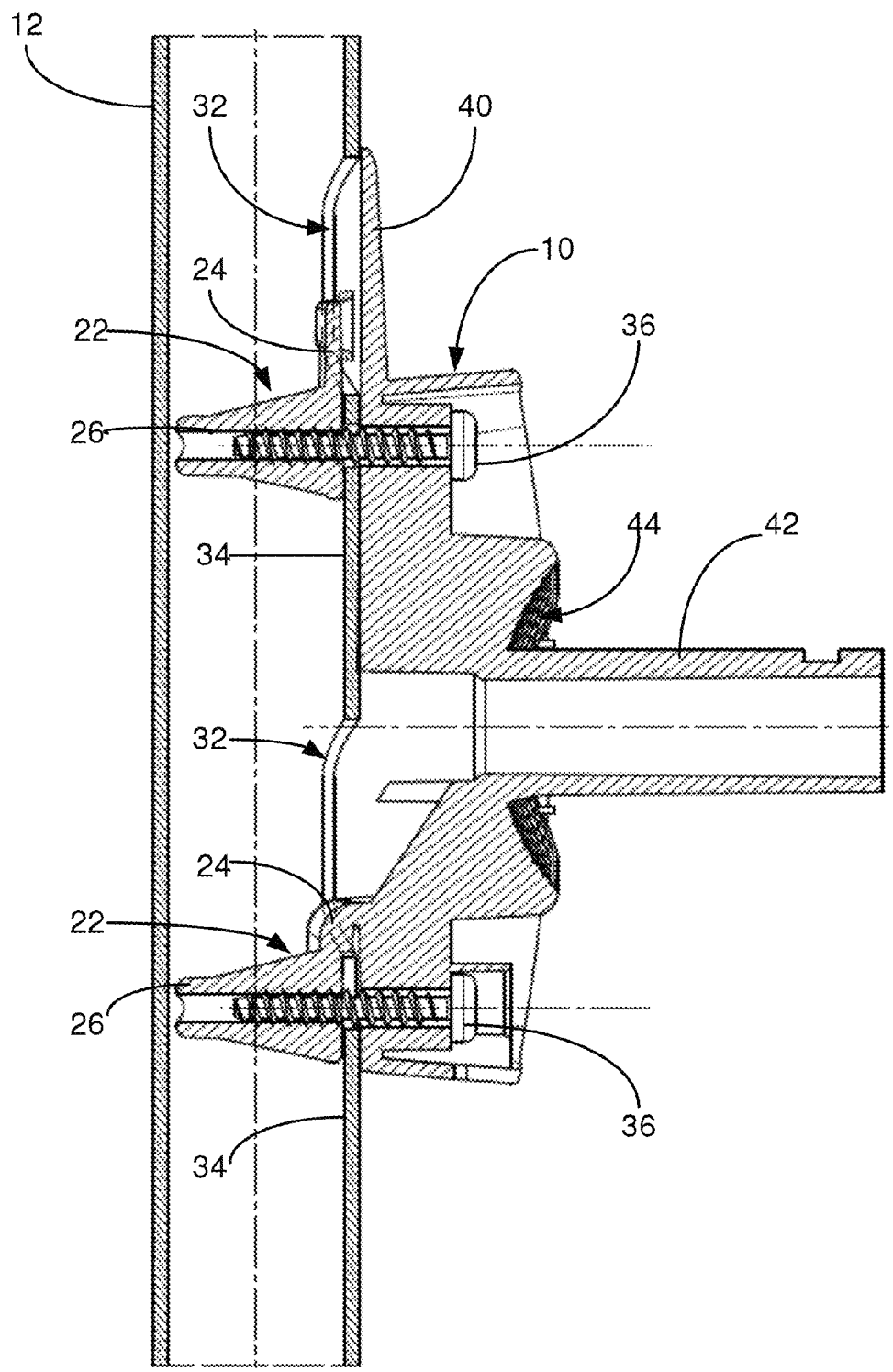

Referring to FIGS. 3 and 6, in the illustrated embodiment, socket joint 10 includes a first concave portion, designated generally as 14, defining a channel having a channel engaging surface 23 extending along a rear side. With further reference to FIGS. 7 and 9, first concave portion 14 is adapted for receiving support tube 12 in a complementary arrangement so that socket joint 10 fits flush against the exterior surface of support tube 12 along the length of first concave portion 14.

Referring to FIG. 3, a central cavity 16 is disposed along first concave portion 14 for improved weight reduction. However, to maintain the strength of socket joint 10, as well as contact with support tube 12 through the region of central cavity 16, a plurality of central support walls 18 are provided in central cavity 16. Each of central support walls 18 includes a concave top surface 20 defining a portion of first concave portion 14 and engaging surface 23 adapted for engaging support tube 12.

Referring to FIGS. 3 and 6, a pair of anchors, designated generally as 22, are disposed in first concave portion 14. Anchors 22 project outwardly in first concave portion 14 for engaging support tube 12 in a clamping arrangement. In the illustrated embodiment, anchors 22 each include a securing arm 24 extending laterally above engaging surface 23 of first concave portion 14, and a hollow fastener prong 26 for receiving a fastening member. As best shown in FIG. 6, a back side 28 of securing arm 24 is convex and complementary to the curvature of interior surface 34 of support tube 12 and engaging surface 23 of first concave portion 14. The spacing between back side 28 of securing arm 24 and engaging surface 23 of first concave portion 14 defines a tube gap, designated generally as 30, which is approximately the thickness of the wall defining support tube 12.

Figure 5:
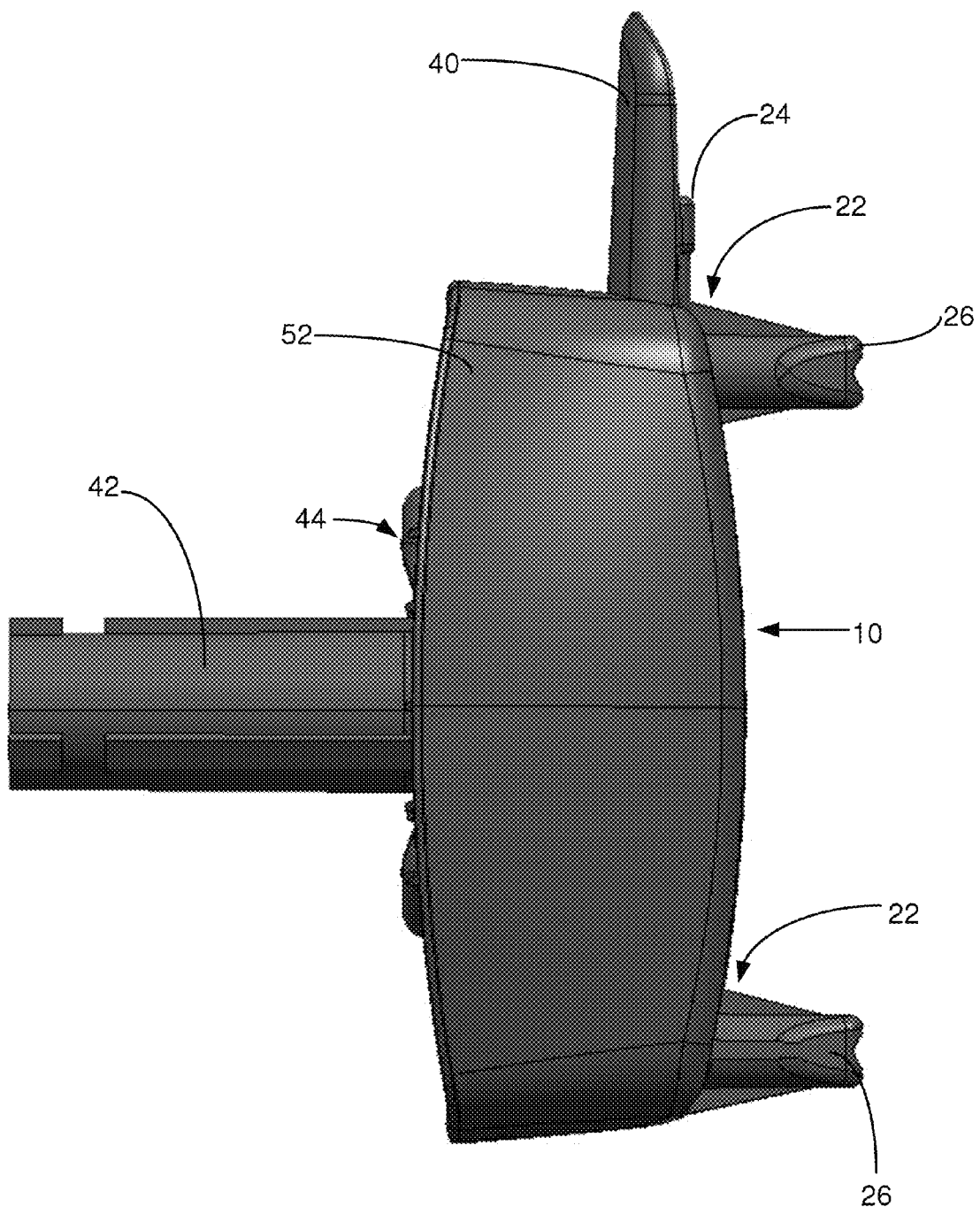
FIG. 5 shows a side elevation view of the socket joint according to the present invention.

Referring to FIGS. 3 and 5, in the illustrated embodiment, an extension tab 40 projects upward from a top side 41 of socket joint 10. Extension tab 40 includes a concave surface consistent with and further defining the channel of first concave portion 14 and engaging surface 23. In the illustrated embodiment, one of anchors 22 is mounted to extension tab 40 to position hollow fastener prong 26 in a desired position relative to support tube 12.

Figure 8:
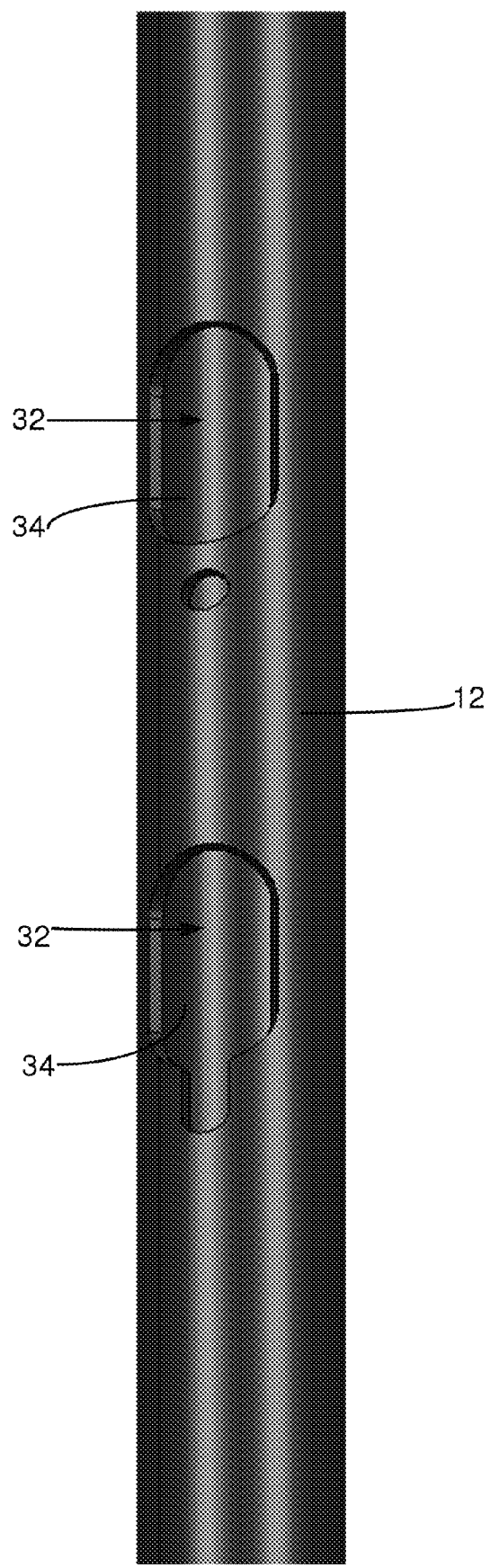
FIG. 8 shows a detailed portion of the support tube according to the present invention; and, FIG. 9 shows a cross-section view of the socket joint mounted to the support tube according to the present invention.

With further reference to FIGS. 7-9, anchors 22 extend through openings 32 (FIG. 8) defined in support tube 12. Once anchors 22 are received into openings 32, socket joint 10 is shifted so that securing arm 24 of each anchor 22 engages an interior surface 34 of support tube 12 and the exterior of support tube 12 is received flush against engaging surface 23 of first concave portion 14. The convex back side 28 is complementary to the curvature of interior surface 34 to provide for a uniform flush engagement of the entire back side 28 of securing arm 24 against interior surface 34. Referring to FIGS. 7 and 9, once socket joint 10 is positioned on support tube 12, a fastener 36 is inserted into hollow fastener prong 26 of each anchor 22 from a front side, designated generally as 38, of socket joint 10. Fastener 36 draws hollow fastener prong 26 and securing arm 24 toward engaging surface 23 of first concave portion 14 to clamp the wall of support tube 12 between anchors 22 and engaging surface 23 of first concave portion 14.

Figure 2:
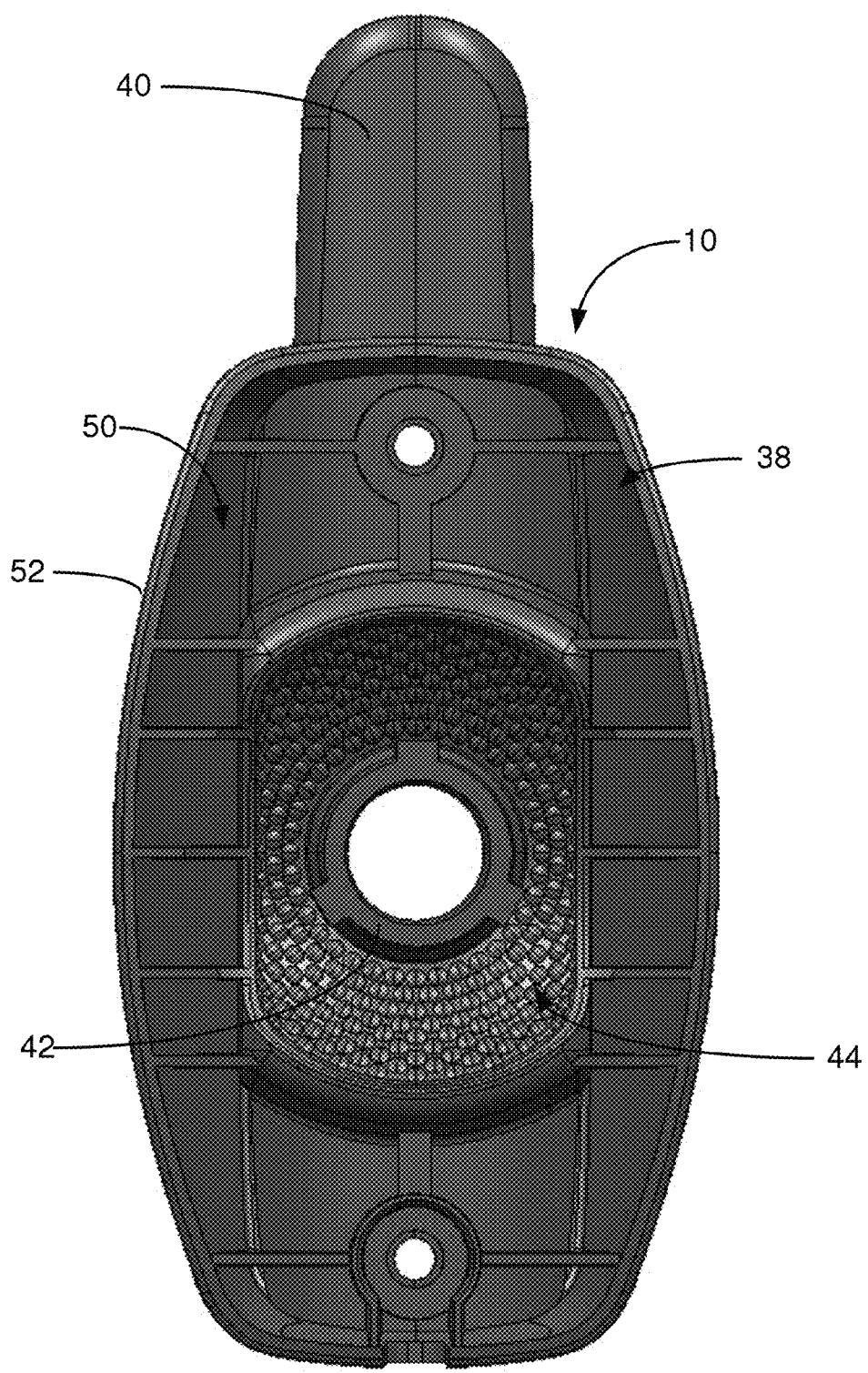
FIG. 2 shows a front elevation view of the socket joint according to the present invention.
Figure 4:
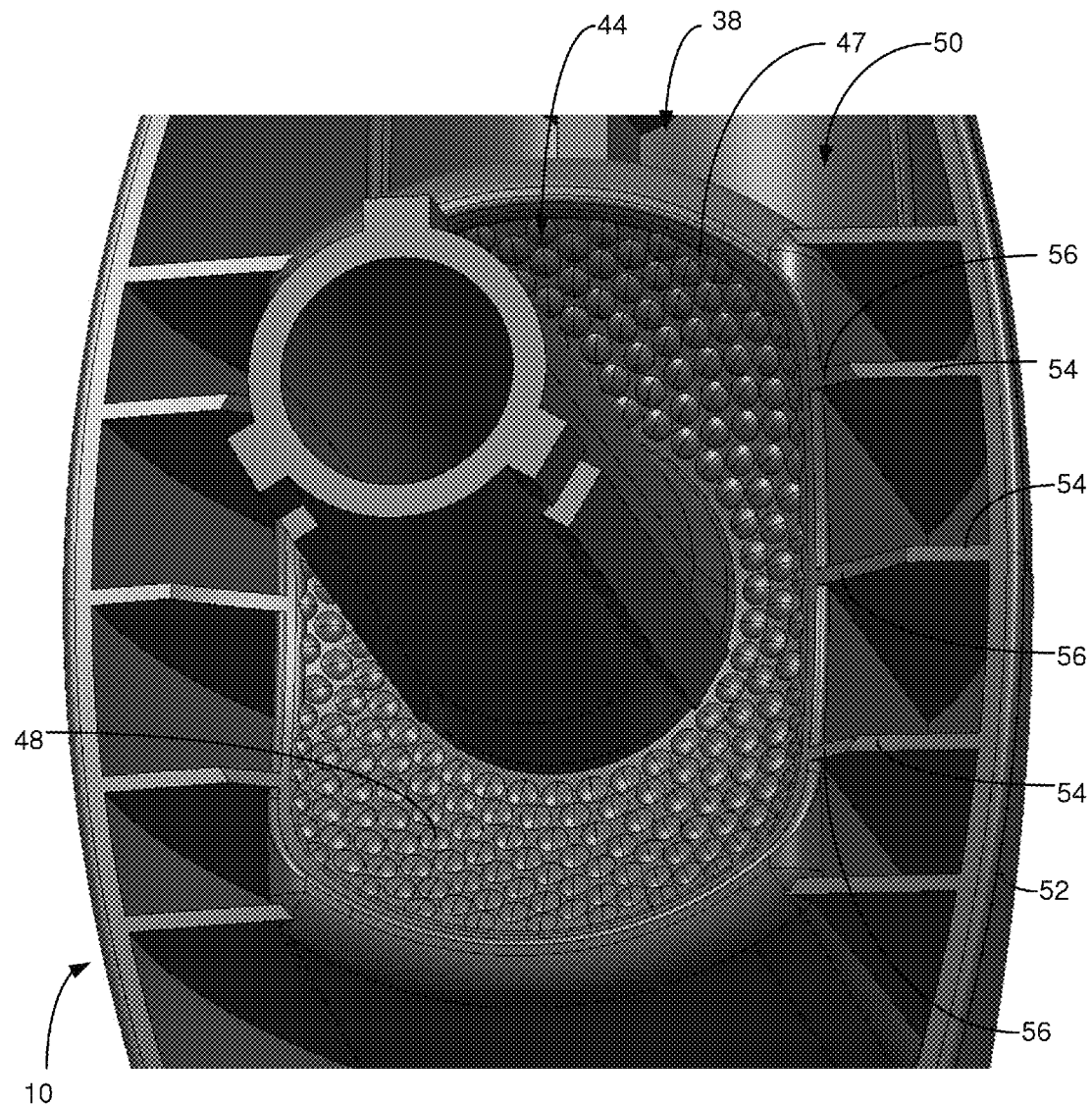
FIG. 4 shows a detailed front perspective view of a portion of the socket joint according to the present invention.

Referring to FIGS. 1, 2 and 4, front side 38 of socket joint 10 is shown, which is adapted for receiving a mirror head (not shown). A central connecting post 42 extends outwardly from front side 38 of socket joint 10 for cooperating with the mirror head. At least one rib 46 is disposed on central connecting post 42. In the illustrated embodiment, a plurality of ribs are provided, which extend generally along the entire length of central connecting post 42. Rib 46 operates as a key for engaging a keyway of connecting components in the mirror head to resist unwanted rotation of the connecting components relative to central connecting post 42.

A second concave portion, designated generally as 44, is disposed around central connecting post 42. Second concave portion 44 defines a pivot surface 47 receiving a complementary shaped convex portion of a housing of the mirror head in sliding engagement. Connecting components of the mirror head cooperate with central connecting post 42 to force the housing against the pivot surface 47 of second concave portion 44, wherein the housing is pivotally carried for adjusting the angle of the mirror head by sliding along pivot surface 47 of second concave portion 44. As best shown in FIG. 4, pivot surface 47 of second concave portion 44 includes a plurality of rounded knobs 48. The mirror head housing engages only the tops of the knobs, allowing for dust and debris to collect in the grooves between rounded knobs, whereby unwanted wear between components is reduces by channeling away debris.

In the illustrated embodiment, a perimeter cavity 50 is provided between second concave portion 44 and exterior wall 52 of socket joint 10 for weight reduction. However, to maintain the strength of socket joint 10, as well as contact with the mirror head housing, a plurality of perimeter support walls 54 are provided in perimeter cavity 50. A series of perimeter support walls 54 includes a concave surface portion 56 extending upward from and maintaining the curvature of pivot surface 47, thus defining a portion of second concave portion 44 for engaging the mirror head housing.

While a preferred embodiment of the invention has been described using specific terms, such description is for illustrative purposes only, and it is to be understood that changes and variations may be made without departing from the spirit or scope of the following claims.

What is claimed is:

1. A socket joint for mounting a mirror head to a support tube on a vehicle exterior, said socket joint comprising:
   a first concave portion disposed on a rear side of said socket joint and adapted for receiving the support tube that attaches to the vehicle;
   a pair of anchors disposed in said first concave portion for engaging an interior surface of the support tube;
   a fastener engaging each of said anchors through a front side of said socket joint and directing said anchors toward said first concave portion so that the support tube is clamped between said anchors and said first concave portion;
   a central connecting post extending outward from said front side for cooperating with the mirror head in interlocking engagement; and,
   a second concave portion disposed around said central connecting post for engaging a complementary convex portion of a housing of the mirror head so that the housing is pivotally carried on said second concave portion for adjusting the angle of the mirror head.

2. The socket joint of claim 1 wherein said first concave portion defines a channel having a channel engaging surface for engaging an exterior surface of the support tube.

3. The socket joint of claim 2 wherein said channel engaging surface has a complementary shape to said exterior surface of support tube so that said channel engaging surface fits flush against the exterior surface of support tube along the length of said first concave portion.

4. The socket joint of claim 3 wherein said anchors each include a securing arm spaced from and extending laterally above said channel engaging surface of said first concave portion, and a hollow fastener prong for receiving said fastening member, wherein said anchors project outwardly from said first concave portion.

5. The socket joint of claim 4 wherein said spacing between a back side of said securing arm and said channel engaging surface of said first concave portion defines a tube gap for receiving said support tube so that said back side of each said anchor engages said interior surface of said support tube and said channel engaging surface engages said exterior surface of said support tube in a clamping arrangement.

6. The socket joint of claim 5 wherein said tube gap is approximately the thickness of the wall defining said support tube so that said support tube is received in a flush engagement with said back side of said securing arm and said channel engaging surface when mounted.

7. The socket joint of claim 5 wherein said back side of said securing arm is convex and complementary to a curvature of said interior surface of said support tube.

8. The socket joint of claim 1 including a central cavity disposed within said first concave portion for improved weight reduction.

9. The socket joint of claim 8 including a plurality of central support walls extending through said central cavity to maintain the strength of the socket joint and engagement with the support tube through the region of said central cavity.

10. The socket joint of claim 9 wherein each of said central support walls includes a concave top surface defining a portion of said first concave portion adapted for engaging the support tube.

11. The socket joint of claim 1 including an extension tab projecting upward from a top side of said socket joint, wherein said extension tab includes a concave surface continuous with and further defining said first concave portion.

12. The socket joint of claim 11 wherein one of said anchors is carried by said extension tab for positioning said anchor relative to the support tube and covering an opening in said support tube through which said anchor is inserted when mounted.

13. The socket joint of claim 1 wherein said second concave portion includes a pivot surface defined by a plurality of rounded knobs projecting upward for engaging the mirror head housing so that only the tops of said rounded knobs engage the mirror head housing to allow dust and debris to collect in grooves between said rounded knobs, whereby unwanted wear between components is reduces by channeling away debris through said grooves.

14. The socket joint of claim 1 including a perimeter cavity disposed between said second concave portion and an exterior wall of the socket joint for weight reduction.

15. The socket joint of claim 14 including a plurality of perimeter support walls carried in said perimeter cavity to provide strength to the socket joint and engagement with the mirror head housing.

16. The socket joint of claim 15 wherein a series of said perimeter support walls includes a concave surface portion extending upward from and maintaining the curvature of said pivot surface for engaging the mirror head housing.

17. The socket joint of claim 1 including at least one rib disposed on said central connecting post for engaging a keyway of connecting components in the mirror head for interlocking engagement with said central connecting post.

18. A socket joint for mounting a mirror head to a support tube on a vehicle exterior, said socket joint comprising:

a pair of anchors disposed on a rear side of said socket joint for engaging the support tube in interlocking engagement;

a central connecting post extending outward from a front side of said socket joint for engaging the mirror head;

a concave portion disposed around said central connecting post for engaging a complementary convex portion of a housing of the mirror head; and, a plurality of rounded knobs disposed on said concave portion for engaging the mirror head housing, wherein said knobs define a plurality of debris grooves disposed between said knobs for collecting and channeling dust and debris away from engaging surfaces between said knobs and the mirror head housing to reduce wear between components.

* * * * *